United States Patent
Moskowitz et al.

(10) Patent No.: US 7,382,947 B1
(45) Date of Patent: Jun. 3, 2008

(54) REMOTE MONITORING OF UNDERSEA CABLE SYSTEMS

(76) Inventors: Laurence Moskowitz, 42 Birchwood La., Hartsdale, NY (US) 10530; Alan Toves, 50 Iroquois Ave., Landing, NJ (US) 07850

( * ) Notice: Subject to any disclaimer, the term of this patent is extended or adjusted under 35 U.S.C. 154(b) by 0 days.

(21) Appl. No.: 11/511,714

(22) Filed: Aug. 29, 2006

(51) Int. Cl.
*G02B 6/35* (2006.01)
*H04B 10/08* (2006.01)

(52) U.S. Cl. .............................. 385/16; 385/48; 398/10

(58) Field of Classification Search ................... 385/16, 385/48, 147; 398/9, 10, 17; 379/1.01, 1.03, 379/9.03, 14.01, 10.01, 15.01; 702/108
See application file for complete search history.

(56) References Cited

U.S. PATENT DOCUMENTS

| | | | |
|---|---|---|---|
| 5,699,402 A * | 12/1997 | Bauer et al. | 379/29.09 |
| 5,883,517 A * | 3/1999 | Broyde et al. | 324/522 |
| 2002/0131099 A1* | 9/2002 | Harasawa | 359/110 |
| 2002/0176130 A1* | 11/2002 | Maeno | 359/110 |

* cited by examiner

*Primary Examiner*—Sarah Song

(57) ABSTRACT

A method and system are provided for remotely monitoring undersea cable systems. Upon receiving a fault alert message, an optical cross-connect is set up between the subject cable station and a testing platform. Testing is conducted and a determination is made whether the fault is in the undersea portion of the network, or in the terrestrial backhaul. By making that determination early, unnecessary technician travel is reduced.

20 Claims, 3 Drawing Sheets

REMOTE MONITORING OF UNDERSEA CABLE SYSTEMS

FIELD OF THE INVENTION

The present invention relates generally to the maintenance of undersea cable systems. More particularly, the present application relates to a method and a system for the remote monitoring of undersea cable systems, and for remotely distinguishing between faults in an undersea cable system and faults in the terrestrial backhaul system.

BACKGROUND OF THE INVENTION

Undersea communications cable systems are a critical part of today's communications infrastructure. A single optical cable, resting on the ocean floor between continents, may be on average capable of transmitting over 8 million concurrent telephone calls. Because of that high transmission density, the downtime resulting from a fault in the cable or its supporting plant equipment is extremely expensive.

Undersea cable systems, by their nature, require maintenance procedures, maintenance equipment and technician expertise that are different from those required in a terrestrial-based system. For that reason, it is often critical to quickly and efficiently determine whether a fault is located in the undersea cable system or in the supporting backhaul or other equipment.

An undersea cable station includes backhaul plant interfacing equipment and other associated equipment. Repairs to undersea cable faults are typically undertaken at the undersea cable station. Undersea cable stations are frequently located in remote coastal areas that are away from population centers. While undersea cable stations were at one time often manned 24×7 with skilled, on-site technicians, that is no longer the case, and a technician must now be dispatched to the station when a fault alarm is received during unmanned hours. Because of the remote locations of the stations, the dispatch is time-consuming, and extends expensive downtime.

Presently, where a central network operating center for the undersea cable system is employed, the decision-making occurs there. That central point, however, is responsible for all carrier traffic and is slow to react to network troubles. It is furthermore difficult for the network operating center to determine whether a fault is located in the undersea cable system, or is in the backhaul or associated terrestrial equipment (i.e., whether the fault is "wet" or "dry"). That is because the central network operating center for the undersea cable system can only see and control the wet side operations.

95% of the undersea cable systems, however, do not contain a central network operations center. There is no tie-in between facility monitoring on undersea cable networks and facility monitoring on the terrestrial network that feeds into the undersea networks. In such a configuration, there is again no way to distinguish between "wet" and "dry" faults.

In either case, valuable time is wasted in responding to a fault alarm. For example, if a technician is dispatched to the undersea cable station, there is a possibility that it will be discovered that the fault is in the backhaul, and the elapsed travel time to the station has been wasted. Conversely, a technician dispatched to the terrestrial plant may discover that the fault is in the undersea cable system. Dispatching technicians in both directions simultaneously is expensive and confusing.

There therefore remains a need for a cost-effective technique to non-intrusively monitor and diagnose fault alarms in undersea cable systems and the associated terrestrial plant and to do that work quickly.

SUMMARY OF THE INVENTION

The invention addresses the needs described above by providing a method and system for remotely monitoring and diagnosing fault alarms in undersea cable systems. One embodiment of the invention is a method for remotely monitoring undersea cable systems. The method comprises the steps of receiving alarm information from an undersea system cable station; requesting, from a database, traffic facility information pertaining to the alarm information; receiving the traffic facility information; transmitting to an optical switch, a command to create a cross-connect; transmitting, to a test set platform, commands to perform a test on the undersea cable system; and receiving test information from the test set platform.

The method may include the step of placing a determination of whether the alarm relates to an underwater fault or a terrestrial fault on a trouble ticket. Based on the interpreting step, it may be determined whether a service call out is necessary to address the alarm and where to send the technician, or a repair time may be estimated.

The method may further include the step of low-loss, non-intrusively monitoring, at the undersea system cable station, a high-speed wavelength. That monitoring may be performed by a value-added module (VAM) which is a splitter at the undersea system cable station.

The test set platform may be an Agilent N2X test set. The step of transmitting to an optical switch, a command to create a cross-connect, may be performed via transaction language 1 (TL1). The commands to perform a test on the undersea cable system may include tool command language (TCL) commands. The database may be the Undersea Network Administration Database (UNAD), which is an undersea circuit facility database.

Another embodiment of the invention is a system for remotely monitoring an undersea cable system. The system comprises an automated alarm/monitoring platform and a value-added module (VAM) inserted on transmit and receive high speed wavelengths at a cable station of the undersea cable system. The VAM is configured to monitor a signal in the undersea cable system. The system further includes a database platform comprising traffic facility information, the database being configured to respond to a request from the automated alarm/monitoring platform for traffic facility information pertaining to the alarm information. A testing platform of the system is configured to receive instructions from the automated alarm/monitoring platform to conduct a performance test on the monitored signal, to conduct the performance test in response to the instructions, to make a determination whether the fault is in the undersea cable system, and to forward the determination to the automated alarm/monitoring platform.

The system may further include an optical switch configured for receiving a command from the automated alarm/monitoring platform and for establishing, in response to the command, a cross-connect between the VAM and the testing platform.

The command to create a cross-connect may be a TL1 command. The automated alarm/monitoring platform may further be configured to place a determination of whether the alarm relates to an underwater fault or a terrestrial fault on a trouble ticket.

The automated alarm/monitoring platform may be configured to determine whether a service call out is necessary to address the alarm, based on the determination whether the fault is in the undersea cable system. The automated alarm/monitoring platform may be configured to estimate a repair time.

The VAM may further include a splitter at the undersea system cable station. The test set platform may be an Agilent N2X test set.

The instructions to conduct a performance test on the undersea cable system may be TCL commands. The database may be a UNAD database.

DESCRIPTION OF THE INVENTION

With the rising costs of operating and maintaining undersea cable systems and cable stations, a tool is required to remotely monitor and support those systems, especially during out-of-office hours. The inventors have developed remote monitoring equipment and software is to improve the repair decision-making process during diagnostics. The inventive system quickly facilitates fault isolation to "wet-side" undersea cable troubles, or to "dry-side" backhaul facility troubles. That quick determination reduces the number of out-of-hours callouts and its associated expenses. During manned hours, technical support is engaged to access the network at the same time as the on-site workforce. Furthermore, with quicker fault isolation, traffic facility outage time is reduced and loss of revenue protected.

The hardware and software utilized in the inventive system is non-intrusive and always connected to the network. Through the use of automatic alarm detection software, facility databases, and automatic diagnostic scripting, fault isolation is done quickly. That additional fault isolation information is added to the trouble ticketing system, and prioritization and callout determination is made based on that information.

Through the use of a second test port with the cable station equipment that is not waiting for an alarm to be detected, the high-speed wavelengths of the undersea cable system are constantly monitored. The data collected can be used to compare against service level agreements and to chart trends of service performance. Troubles may then be proactively avoided by taking preventive maintenance actions.

The inventive design allows quick fault isolation and determination of the need for call-out. Operations expenses are reduced in an environment of rising operations costs. The inventive system further protects against revenue loss due to extended network outages. Through the automation of the fault detection and reporting process, fault diagnostic information is provided in simple terms in the trouble ticket, making it easier and faster to resolve network troubles.

Figure 1:
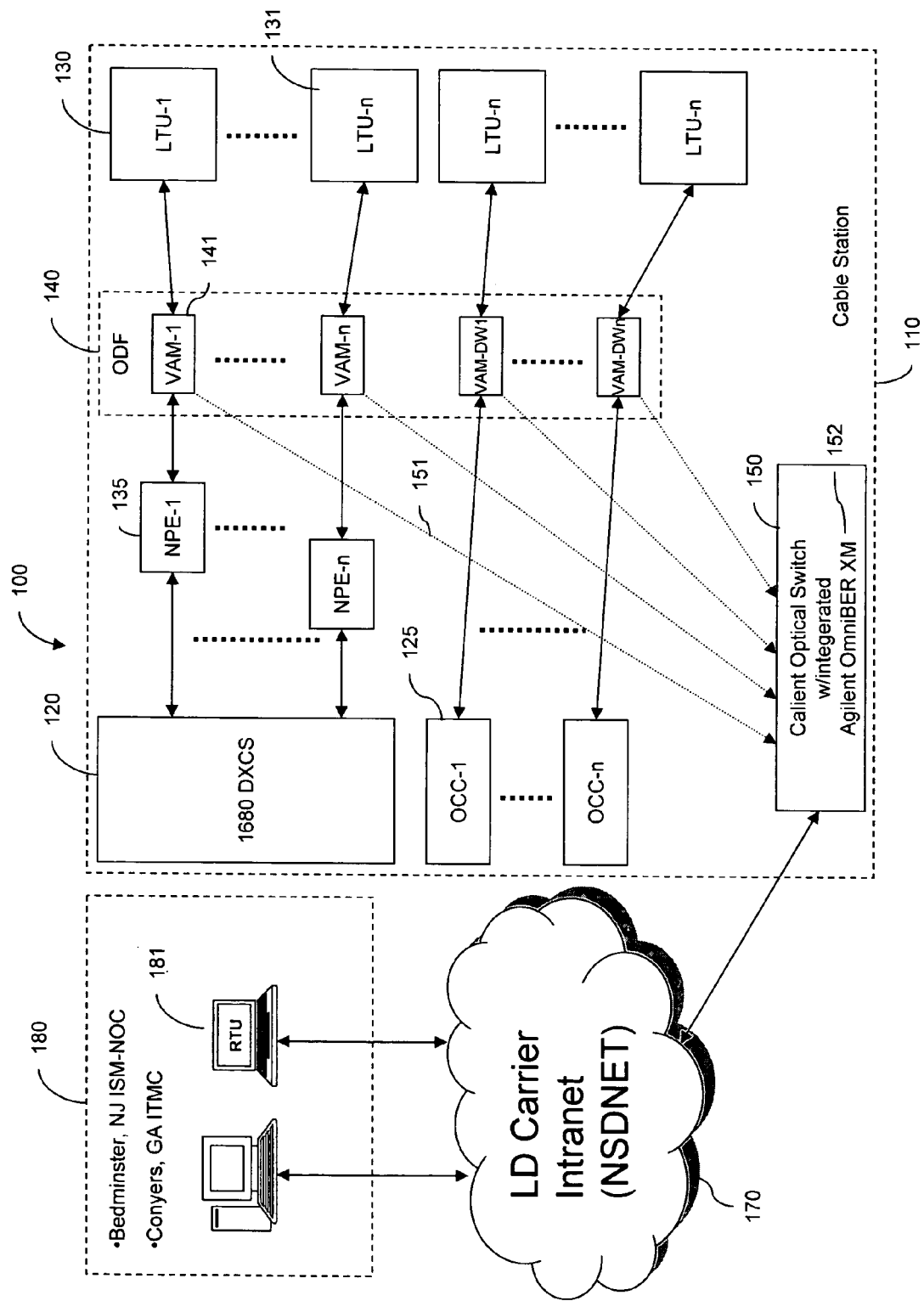
FIG. 1 is a schematic representation of a cable station and related network components according to one embodiment of the invention.

The monitoring system 100 of the invention will be described with reference to FIG. 1. A cable station 110 includes a digital cross-connect system (DXCS) 120 connected through network protection equipment (NPE) 135 to an optical distribution frame (ODF) 140. The ODF connects to line termination units (LTUs) 130 that terminate terrestrial backhauls and the undersea plant. Other similar connections are made to other line termination units LTU-n 131 from the DXCS and from other common carriers (OCC) 125.

Inserted on the transmit and receive high-speed wavelengths (2.5 Gb/s or 10 Gb/s) within the ODF 140 are value-added modules (VAMs) 141 or splitters. The VAMs 141 permit low-loss non-intrusive monitoring of the signal. The monitored signal is forwarded to an optical switch 150. In the embodiment preferred by the inventors, an optical switch manufactured by Calient Networks of San Jose, Calif. is used.

A cross-connect is made at the optical switch 150, whereby the tapped signal 151 is monitored by a test set platform 152. The test set platform 152 may be integrated with the optical switch 150 as shown in FIG. 1, or may be a separate unit. In a preferred embodiment of the invention, the test set platform is an Agilent N2X test set.

The test set platform 152 has the ability to monitor alarm, event and performance information for the tapped high speed wavelength and the associated wavelengths sub-rate signals 151. For example, a TCL script in the test set platform 152 may control the activation and deactivation of lasers and receivers, and interpret the resulting signals. Analysis of the alarm information of the high-speed wavelength by the test set platform 152 allows for a quick determination of whether a wet or dry failure has occurred. Further, any or all particular sub-rate signals can be monitored to further isolate which terrestrial facilities have failed. In a preferred embodiment, automation is achieved through the use of software Perl scripts, TL1 software scripts to control the Calient optical switch and TCL software scripts to control the Agilent N2X test set.

As will be described below, a connection between the optical switch 150 and a long distance carrier intranet 170, such as the AT&T Intranet, is used to initiate the necessary cross-connects and to carry testing commands and results from remote facilities 180 including remote terminal units (RTUs) 181.

Figure 2:
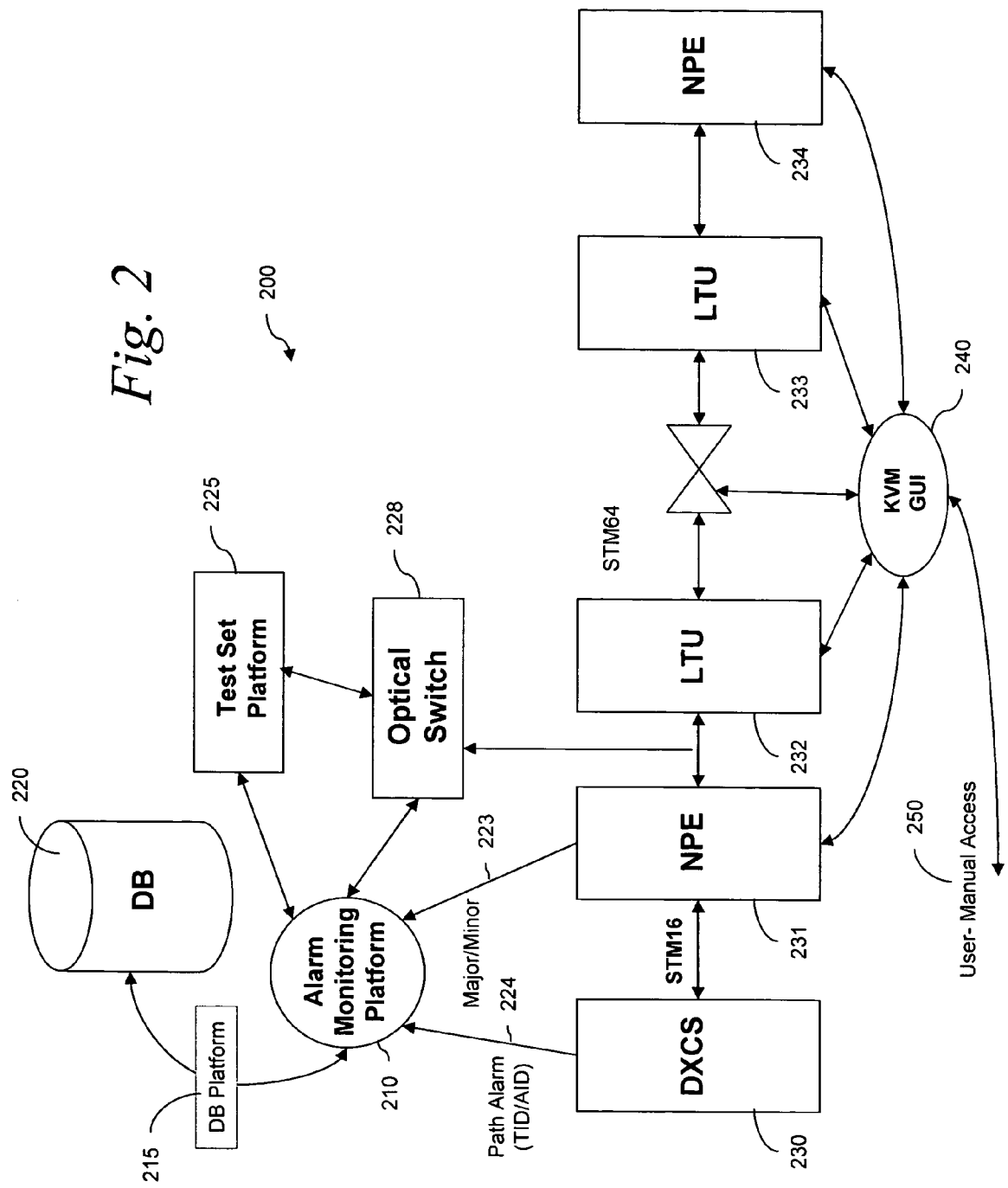
FIG. 2 is a schematic representation of a system for monitoring undersea cable installations according to one embodiment of the invention.

A system 200, according to one embodiment of the invention, is shown in FIG. 2. That system includes an automated alarm/monitoring platform 210, which, in conjunction with other elements of the system 200, performs alarm monitoring methods according to the invention. In a currently preferred embodiment, the platform runs a scripting software such as RUBY scripting software, a proprietary scripting software of AT&T. The alarm/monitoring platform 210 may run out of a transport service center of a long distance carrier.

A single long distance backhaul path is shown in FIG. 2, from a DXCS 230, through NPE 231 to LTU 232, as described above. The path continues through additional LTU 233 to NPE 234, etc. Each element of the path is monitored using an interface 240, providing manual access 250.

The automated alarm/monitoring platform 210 receives alarm information 224 from the undersea cable systems DXCS 230. The platform 210 then retrieves traffic facility information from a database 220, using information from the alarm as a retrieval key. The database 220 may be a UNAD database in a GeoLink platform 215, UNAD and GeoLink being proprietary databases of AT&T.

Based upon the traffic facility information received from the database 220, the automated alarm/monitoring platform 210 sends commands via TL1 to create a cross-connect on the optical switch 228 between test set platform 225 (e.g., an Agilent OmniBER XM test set) and a VAM (not shown).

The platform 210 sends TCL commands to the test set platform 225, initiating and controlling the testing procedure. The information that is obtained from the test set platform 225 is then interpreted by the automated alarm/monitoring platform 210. A determination is made in the alarm/monitoring platform 210 as to whether the fault is a wet-side or dry-side fault. In an alternative embodiment, the determination is made in the test set platform 225 and forwarded to the fault monitoring platform 210.

In either case, that wet vs. dry determination, together with associated information, is placed by the alarm monitoring platform 210 in a trouble ticket (not shown). If the cable station is unmanned, a transport maintenance center such as the AT&T International Transport Maintenance Center (ITMC) will make a decision as to whether a call-out is necessary and prioritize the trouble ticket. If the cable station is manned, the ticket will also be picked up by the on-site workforce and will help in isolating the fault and minimizing traffic outage. Additionally, Tier II and III technical support can assist quickly in determining where the fault lies and what corrective action can be taken. Decisions on repair times and whether restoration is necessary will also occur quicker and more efficiently.

Figure 3:
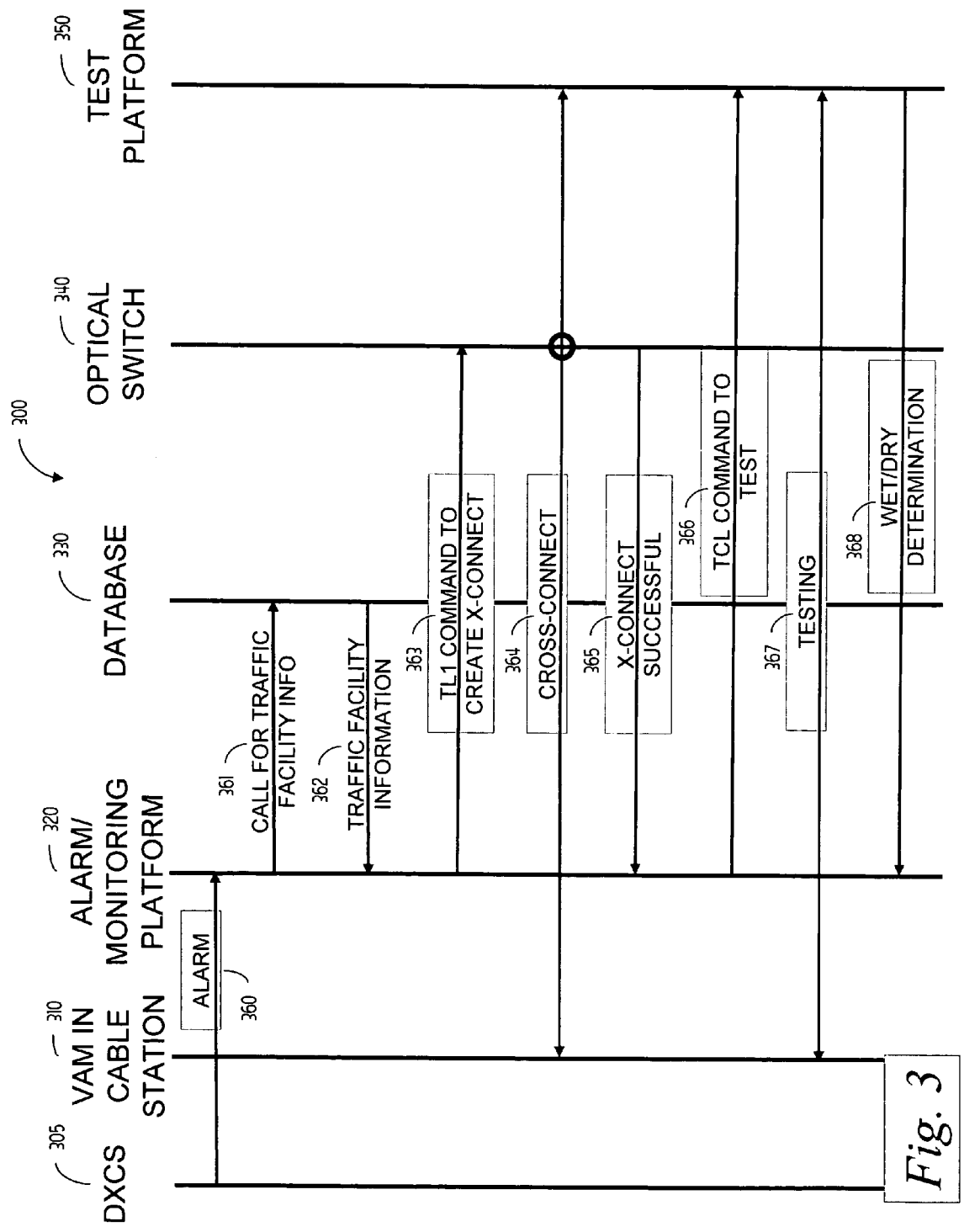
FIG. 3 is a timing chart depicting a method according to one embodiment of the invention.

A method for monitoring faults in an undersea cable system according to one embodiment of the invention will now be described with reference to the timing chart 300 of FIG. 3. The process is triggered when a receive path alarm 360, including a target ID/access ID (TID-AID) from the DXCS 305, is transmitted from the DXCS in the cable station to the alarm/monitoring platform 320. The alarm/monitoring platform 320 then transmits at least one query 361 to the database 330 to retrieve traffic facility information. In response, the database 330 transmits traffic facility information 362 back to the alarm/monitoring platform 320.

In a preferred embodiment using the proprietary UNAD database, two exchanges (not shown) actually take place between the alarm/monitoring platform and the UNAD database. In response to a first UNAD query including a common language facility identifier (CLFI) (i.e., via GEOLINK Platform), the UNAD database provides International Telecommunications Unit (ITU) facility information. A second query is then sent from the alarm/monitoring platform, including the ITU facility information, UNAD #, and Cable Station ID. In response, the UNAD database 330 provides CLFI hierarchy and/or slotting within the Synchronous Transport Module level 64 (STM-64) or the STM-16. If required, assignment mapping to an optical switch alias is also provided.

The alarm/monitoring platform 320 then sends TL1 commands 363 to an optical switch 340 to establish a cross-connect. The TL1 commands activate a specific port to a particular VAM. The cross-connect 364 is set up by the optical switch 340 between the VAM 310 in the cable station and the Agilent test platform 350. The optical switch 340 may send a confirmation 365 to the alarm/monitoring platform 320 that the cross-connect was successfully established.

The alarm/monitoring platform 320 then sends TCL commands 366 to the test platform 350. The commands 366 include instructions to perform tests. The test platform 350 then runs the tests 367 via a TCL script, over the cross-connect with the cable station 310. The test results, which may include a "wet/dry" determination 368, are then transmitted from the test platform 350 to the alarm/monitoring platform 320. The test results may also include specific results such as SDH overhead. The alarm/monitoring platform 320 creates and routes a ticket that includes at least some of the test results.

The benefits of implementing the inventive solution are a reduction in operations and maintenance expenses and increased revenue protection. As the cost of operating and maintaining undersea cable systems continues to rise, the trend is to reduce the staffing hours. To reduce hours and thus costs of labor and utilities, the monitoring and trouble resolution must be moved to a remote network operation center. The center will determine whether or not to call out to station personnel to fix a trouble.

By determining whether the fault is a wet-side or dry-side fault, unnecessary call-outs and thus costs can be avoided. Furthermore, trouble resolution is quicker because a fault is better isolated to a particular piece of equipment making up the network. By resolving network outages quicker, operations expense avoidance is achieved and protection against loss of revenue is also achieved.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to particular databases, scripting languages and command languages, the method and apparatus of the invention may be embodied by any system performing the steps or embodying the structure set forth in the claims. It is to be understood that the embodiments shown and described herein are only illustrative of the principles of the present invention and that various modifications may be implemented by those skilled in the art without departing from the scope and spirit of the invention.

What is claimed is:

1. A method for remotely monitoring undersea cable systems, the method comprising the steps of:
   receiving alarm information from an undersea system cable station;
   requesting, from a database, traffic facility information pertaining to the alarm information;
   receiving the traffic facility information;
   transmitting to an optical switch, a command to create a cross-connect;
   transmitting, to a test set platform, commands to perform a test on the undersea cable system via the cross-connect; and
   receiving test information from the test set platform.

2. The method of claim 1, further comprising the step of:
   placing a determination of whether the alarm relates to an underwater fault or a terrestrial fault on a trouble ticket.

3. The method of claim 1, further comprising the step of:
   based on the test information, determining whether a service call out is necessary to address the alarm.

4. The method of claim 1, further comprising the step of:
   based on the test information, estimating a repair time.

5. The method of claim 1, further comprising the step of:
   low-loss, non-intrusively monitoring at the undersea system cable station a high-speed wavelength.

6. The method of claim 5, wherein the step of low-loss, non-intrusive monitoring is performed by one of a value-added module (VAM) and a splitter at the undersea system cable station.

7. The method of claim 1, wherein the test set platform is an Agilent N2X test set.

8. The method of claim 1, wherein the step of transmitting to an optical switch, a command to create a cross-connect, is performed via TL1.

9. The method of claim 1, wherein the commands to perform a test on the undersea cable system comprise TCL commands.

10. The method of claim 1, wherein the database comprises a UNAD database.

11. A system for remotely monitoring an undersea cable system, comprising:
an automated alarm/monitoring platform;
a value-added module (VAM) inserted on transmit and receive high speed wavelengths at a cable station of the undersea cable system, the VAM being configured to monitor a signal in the undersea cable system;
a database platform comprising traffic facility information, said database configured for receiving a request from the automated alarm/monitoring platform for traffic facility information pertaining to the alarm information; and
a testing platform configured to receive instructions from the automated alarm/monitoring platform to conduct a performance test on the monitored signal, to conduct the performance test in response to the instructions, to make a determination whether the fault is in the undersea cable system, and to forward the determination to the automated alarm/monitoring platform.

12. The system of claim 11, further comprising:
an optical switch configured for receiving a command from the automated alarm/monitoring platform and for establishing, in response to the command, a cross-connect between the VAM and the testing platform, and for establishing the cross-connect.

13. The system of claim 12, wherein the command to create a cross-connect is a TL1 command.

14. The system of claim 11, wherein the automated alarm/monitoring platform is further configured to place a determination of whether the alarm relates to an underwater fault or a terrestrial fault on a trouble ticket.

15. The system of claim 11, wherein the automated alarm/monitoring platform is further configured to determine whether a service call out is necessary to address the alarm, based on the determination whether the fault is in the undersea cable system.

16. The system of claim 11, wherein the automated alarm/monitoring platform is further configured to estimate a repair time.

17. The system of claim 11, wherein the value-added module (VAM) further comprises a splitter at the undersea system cable station.

18. The system of claim 11, wherein the test set platform is an Agilent N2X test set.

19. The system of claim 11, wherein the instructions to conduct a performance test on the undersea cable system comprise TCL commands.

20. The system of claim 11, wherein the database comprises at least a UNAD database.

* * * * *